United States Patent [19]

Katayose et al.

[11] Patent Number: 5,287,471
[45] Date of Patent: Feb. 15, 1994

[54] DATA TRANSFER CONTROLLER USING DIRECT MEMORY ACCESS METHOD

[75] Inventors: Tsuyoshi Katayose; Yukio Maehashi, both of Tokyo, Japan

[73] Assignee: NEC Corporation, Tokyo, Japan

[21] Appl. No.: 556,484

[22] Filed: Jul. 24, 1990

[30] Foreign Application Priority Data

Jul. 24, 1989 [JP] Japan .................. 1-191747

[51] Int. Cl.⁵ .............................. G06F 13/00
[52] U.S. Cl. ...................... 395/425; 364/DIG. 1
[58] Field of Search ... 364/242.3, 242.31, DIG. 1 MS File;
395/425; 365/189.01, 230.01

[56] References Cited

U.S. PATENT DOCUMENTS

| | | | |
|---|---|---|---|
| 4,723,223 | 2/1988 | Hanada | 364/900 |
| 4,797,809 | 1/1989 | Sato et al. | 364/DIG. 1 |
| 4,797,851 | 1/1989 | Suzuki | 364/900 |
| 4,797,853 | 1/1989 | Savage et al. | 364/DIG. 1 |
| 4,912,632 | 3/1990 | Gach et al. | 364/DIG. 1 |
| 4,989,135 | 1/1991 | Miki | 364/200 |
| 5,003,465 | 3/1991 | Chisholm et al. | 364/DIG. 1 |
| 5,056,010 | 10/1991 | Huang | 364/200 |

FOREIGN PATENT DOCUMENTS

0109308 5/1984 European Pat. Off.
0217350 4/1987 European Pat. Off.

OTHER PUBLICATIONS

Intel Data Sheet 8237A High Performance Programmable DMA Controller, Oct. 1987.
IBM Technical Disclosure Bulletin, vol. 27, No. 10B, Mar. 1985, pp. 6115–6117, New York, U.S., "Rotating queues for operate input/output transfers", FIGS. 1, 2; p. 6117, lines 1–32.

*Primary Examiner*—Joseph L. Dixon
*Attorney, Agent, or Firm*—Foley & Lardner

[57] ABSTRACT

A data transfer controller for controlling DMA data transfer between a memory area and a peripheral unit. The data transfer controller has a first register which stores address information relative to a predetermined address of the memory area. A DMA control unit uses the first register and a second register to perform the DMA data transfer between the memory area and the peripheral unit. The data transfer controller also has a third register for storing data used for accessing the memory area of the DMA transfer. An updater is used to update the contents of the third register whenever a memory access uses the third register and is different from a memory access associated with data transfer between the memory area and the peripheral unit. Finally, a counter changes the contents of the third register in one direction whenever the data transfer between the memory area and the peripheral unit is performed. The counter changes the contents of the third register in an opposite direction whenever memory access using the third register is performed.

14 Claims, 14 Drawing Sheets

DATA TRANSFER CONTROLLER USING DIRECT MEMORY ACCESS METHOD

BACKGROUND OF THE INVENTION

The present invention relates to a data transfer controller using a direct memory access (DMA) method and, more particularly, to a DMA controller for performing a data transfer between a memory and a peripheral unit.

In an information processing system employing a microcomputer, it is often necessary to transfer a number of data between a memory and a peripheral, unit. In such a case, if a central processing unit (CPU) is programmed to respond to an interrupt request from the peripheral unit and to then perform the data transfer in an interrupt program routine, an overhead of CPU, i.e. a time for interrupt processing, is increased resulting in lowering the data processing efficiency. Therefore, a DMA controller (DMAC) is proposed and employed as a data transfer controller for performing the data transfer in place of the CPU.

When the DMAC receives a DMA data transfer request from the peripheral unit such as a serial data communication control unit, a printer control unit, a display control unit and so forth, it requests a bus control right using address, data and control buses to CPU. In response to this request from the DMAC, the CPU suspends the program execution and then transfers the bus control right to the DMAC. The DMAC thereby performs the data transfer between the peripheral unit and the memory by use of the buses without intervention by the CPU. When a predetermined number of data are thus transferred between the peripheral unit and the memory by the DMA data transfer, the DMAC informs the CPU of the DMA transfer completion. When the CPU detects the DMA transfer completion, it either accesses the memory to read and process the data in the case of the DMA transfer from the peripheral unit to the memory, or it accesses the memory to write data to be transferred next in the case of the DMA transfer from the memory to the peripheral unit.

As a recent information processing system is demanded to further enhance the data processing efficiency and speed, the CPU is required to read and process the data transferred to the memory or to write new data into the memory at arbitrary timings without waiting for the DMA transfer completion information from the DMAC. To this end, the CPU has to detect not only the execution of the DMA data transfer but also the address of the memory to which the data from the peripheral unit has been transferred or the address of the data which has been transferred to the peripheral unit. That is, the CPU is required to monitor the execution state of the DMAC by a program. Hence, program overhead can be a serious problem.

SUMMARY OF THE INVENTION

Therefore, an object of the present invention is to provide an improved data transfer controller.

Another object of the present invention is to provide a data transfer controller causing a CPU to facilitate the reading of data from a memory, which are transferred from a peripheral unit by DMA transfer, and/or the writing of data into the memory, which are to be transferred to the peripheral unit, at arbitrary timings.

Still another object of the present invention is to provide a data transfer controller causing a predetermined area of a memory to be used as a buffer area with a ring construction in DMA transfer.

A data transfer controller according to the present invention comprises a first register for storing address information relative to a predetermined address of a DMA transfer area of a memory, a second register for storing the number of data to be transferred, a DMA control unit for performing a data transfer between the memory and a peripheral unit by use of the first and second registers, a third register for storing data used for accessing the DMA transfer area of the memory, an updater for updating the data stored in the third register each time a memory access using the third register and being different from a memory access for the data transfer between the memory and the peripheral unit is performed, and a counter unit for changing in one direction a content thereof each time the data transfer between the memory and the peripheral unit is performed and for changing in an opposite direction the content thereof each time the memory access using the third register is performed.

Thus, the third register stores the data relative to the address of the memory from which data is to be read out next or into which data is to be written next, and the contents of the counter unit represents the number of data which are to be read out by the CPU or to be transferred to the peripheral unit. Accordingly, by only checking the contents of the counter unit, the CPU can detect whether or not the data read and write operations are possible, and further can detect the number of data to be dealt. Moreover, since the third register stores the data necessary for the memory access by the CPU, the CPU is free from the address management of memory accesses.

BRIEF DESCRIPTION OF THE DRAWINGS

The above and other objects, advantages and features of the present invention will he more apparent from the following description taken in conjunction with the accompanying drawings, in which.

DETAILED DESCRIPTION OF THE INVENTION

Figure 1:
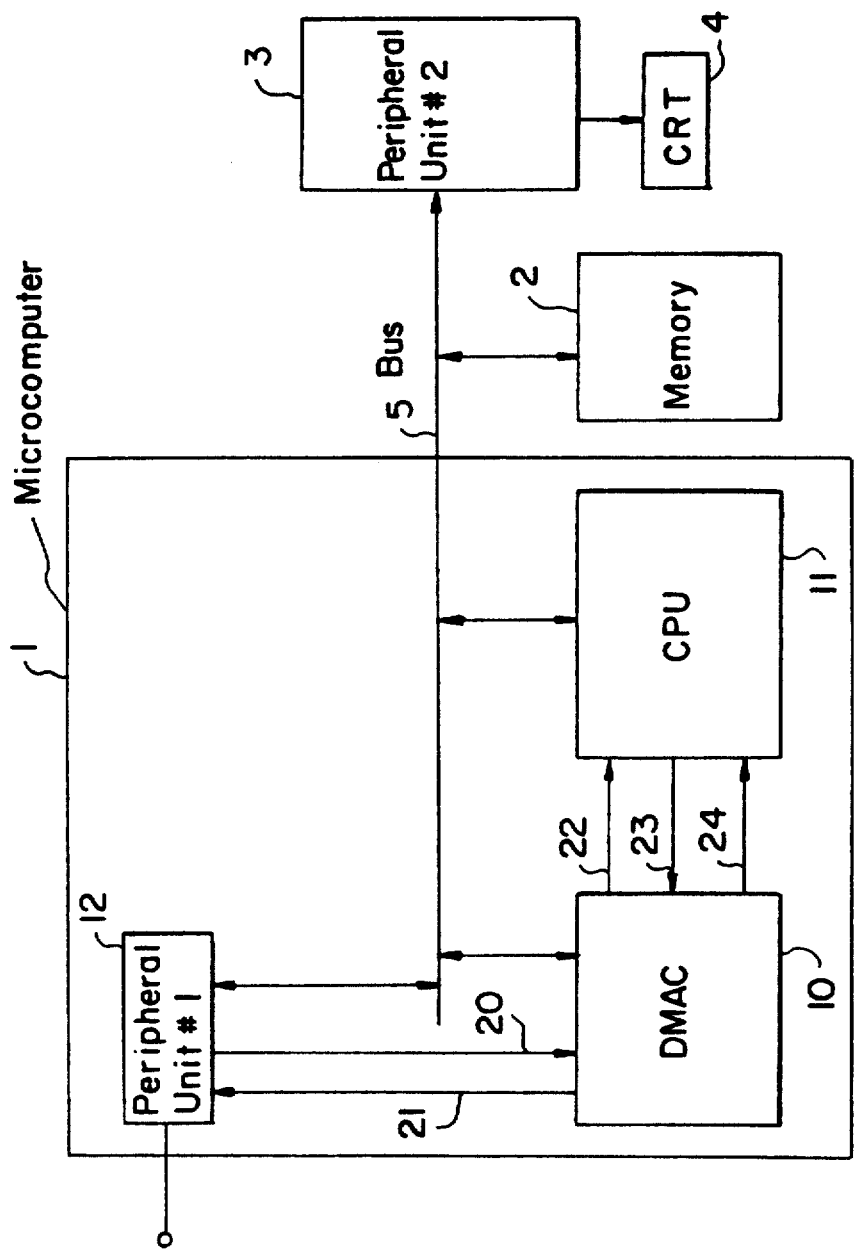
FIG. 1 is a block diagram representative of an information processing system employing a DMAC according to a first embodiment of the present invention.

Referring now to FIG. 1, DMAC 10 according to a first embodiment of the present invention is incorporated into a microcomputer 1 along with CPU 11 and a peripheral unit 12. In this embodiment, DMAC 10 performs a data transfer from the peripheral unit 12 to a memory 2 without intervention of CPU 11. The peripheral unit 12 operates as a serial data communication control unit to an externally provided device (not shown) and includes a data read/write buffer (also not shown). The CPU 11, DMAC 10 and the peripheral unit 12 are interconnected to each other via an internal bus which is in turn led out as a system bus 5 including address, data and control buses. The bus 5 is further coupled to the memory 2 and another peripheral unit 3. The data from the externally provided device such as a keyboard are received by the pheripheral unit 12 and then transferred to the memory 2 by means of DMAC 10. The data thus transferred to the memory 2 are thereafter read out therefrom and then processed by CPU 11. The processed data are then supplied to the peripheral unit 3. In this embodiment, the peripheral unit 3 serves as a display control unit which controls a display unit 4 such as a cathode ray tube (CRT) 4 in response to the data from CPU 11. CPU 11 thus performs an image process operation on the data supplied from the unit 12 to the memory 2. As well known in the art, CPU 11 includes a program counter, a program status word register, an arithmetic and logic unit, a set of working register and so forth (all not shown) and executes a program stored in the memory 2. CPU 11 further performs a transfer/receiving operation of a bus control right of the bus 5 in response to a request from DMAC 10. The memory 2 includes a program memory for storing the program to be executed by CPU 11 and a data memory for temporarily storing data. The data memory of the memory 2 includes a DMA transfer destination area into which the data are transferred from the peripheral unit 12 by DMA transfer.

Figure 2:
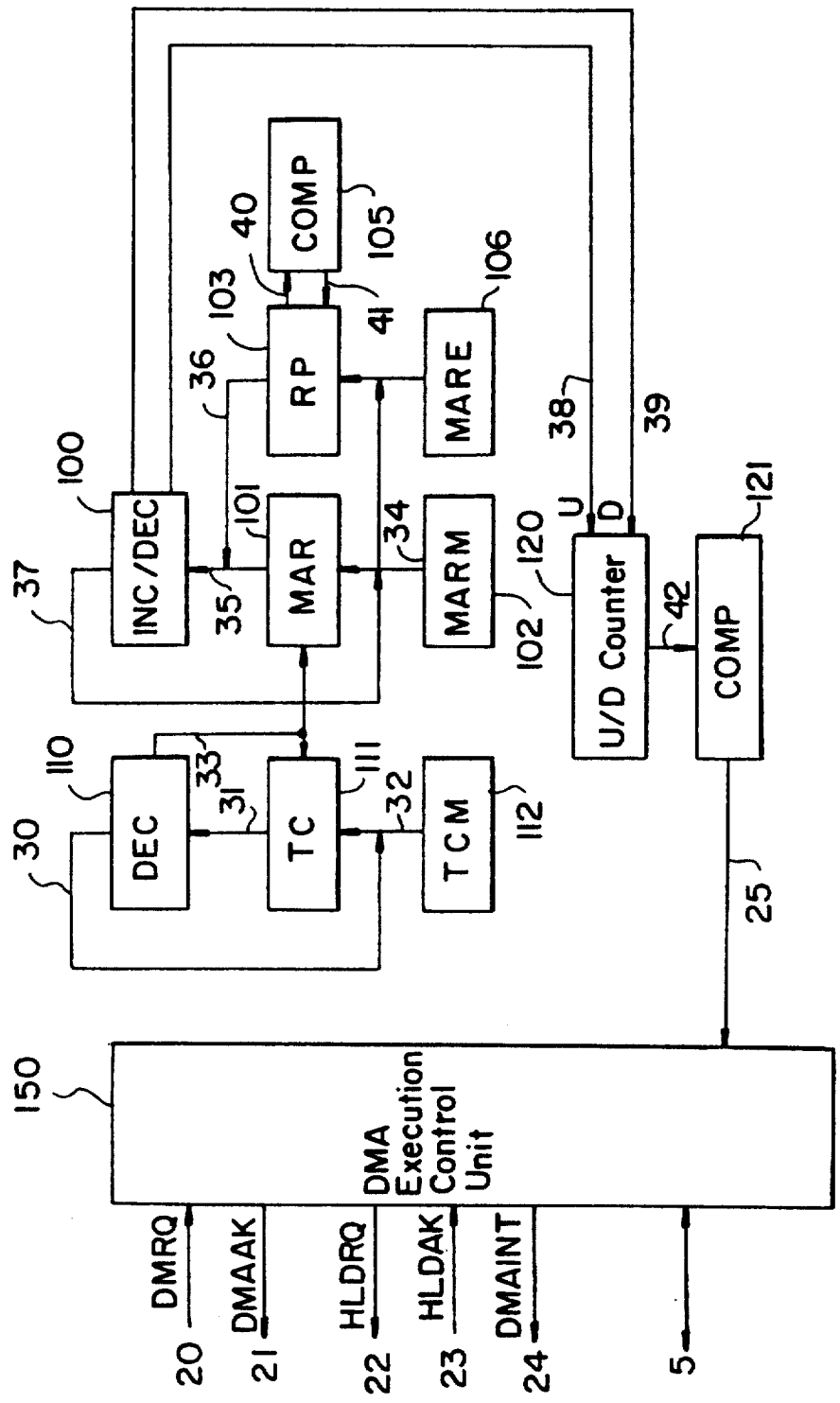
FIG. 2 is a block diagram representative of an internal construction of the DMA shown in FIG. 1.

Referring to FIG. 2, DMAC 10 includes a memory address modulo register (MARM) 102 for temporarily storing a leading address of the DMA transfer destination area of the memory 2, a memory address register (MAR) 101 for storing a current memory address during the DMA data transfer, a terminal counter modulo register (TCM) 112 for storing the size of the destination area in terms of the number of DMA transfers, i.e. the number of data transfer to be performed, a terminal counter (TC) 111 for storing the number of DMA data transfers which can still be performed before filing the destination area 500, a read pointer (RP) 103 for designating a memory address of the memory 2 from which CPU 11, is to read the data next, an up and down counter (U/D counter) 120 for counting up the content thereof each time the DMA transfer is performed and counting it down each time the content of RP 103 is read out therefrom, a compare register (COMP) 121 for comparing the count value of the U/D counter 120 with data stored therein and producing a coincident signal 25 when both of them are equal to each other, an incrementer/decrementer (INC/DEC) 100 for incrementing or decrementing the contents of MAR 101 and RP 103, a second compare register (COMP) 105 for comparing the content of RP 103 with data stored therein to produce a coincident signal 41 indicating that both of them are equal to each other, a register (MARE) 106 for storing address data to be set again into RP 103, and a decrementer (DEC) 110 for decrementing the content of TC 111. DMAC 10 further includes a DMA execution control unit 150 which has, although not shown, a read/write buffer coupled to the bus 5, a control register storing control information such as a data transfer direction, an access timing and so forth, and a transfer-enable flag. The control unit 150 thus controls a whole operation of DMAC by performing a request/release operation of the bus control right, a DMA data transfer timing control operation and an updating operation on the respective above-mentioned registers. It should be noted that data read/write lines between the control unit 150 and the respective registers are omitted to avoid complicating the drawing.

Figure 3B:
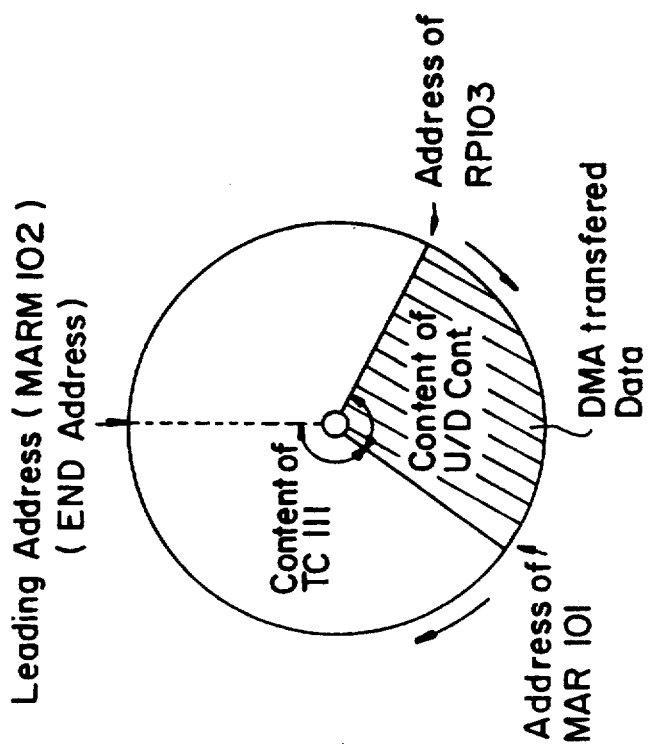
FIGS. 3A and 3B are memory maps of a memory shown in FIG. 1.
Figure 3A:
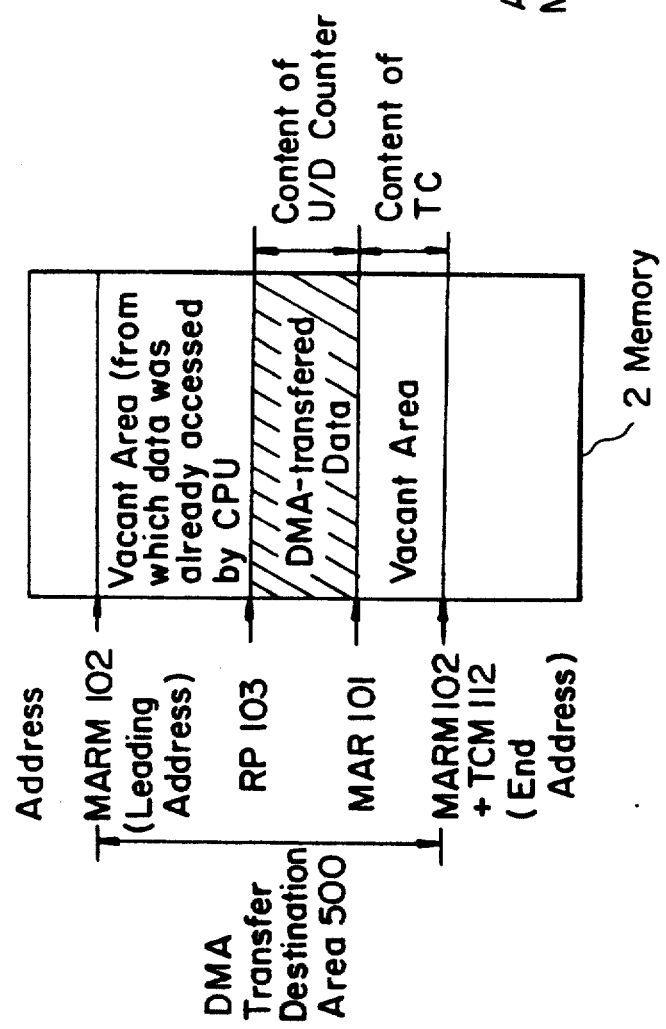

In order that DMAC 10 performs a data transfer from the peripheral unit 12 to the data transfer destination area 500 of the memory 2 shown in FIG. 3A, DMAC 10 requires initial data to be set into the respective registers. This initial data setting operation is performed by CPU 11 in accordance with a program flow chart shown in FIG. 4A. More specifically, the leading address of the transfer destination area 500 of the memory 2 is set into MARM 102, MAR 101, RP 103, respectively (Step 401). TC 111 and TCM 112 are written with the data number of the area 500 minus 1 (Step 402). The data number represents the number of bytes of the area 500 from the leading address to the last address in case the of byte data transfer, for example. COMP 121 is set with the data number minus α (Step 403). α is zero to a few bytes. The U/D counter 120 is initialized to zero (Step 404). COMP 105 and MARE 106 are written with the last address of the area 500 minus 1 (Step 405), followed by the transfer-enable flag of the control unit 150 being set to allow the DMA data transfer (Step 406). CPU 11 thereafter performs other operations in accordance with the program from the memory 2. During the program execution, CPU 11 further detects the generation of a hold request signal (HLDRQ) 22 from DMAC 10 by means of an internally provided hardware circuit.

Figure 5A:
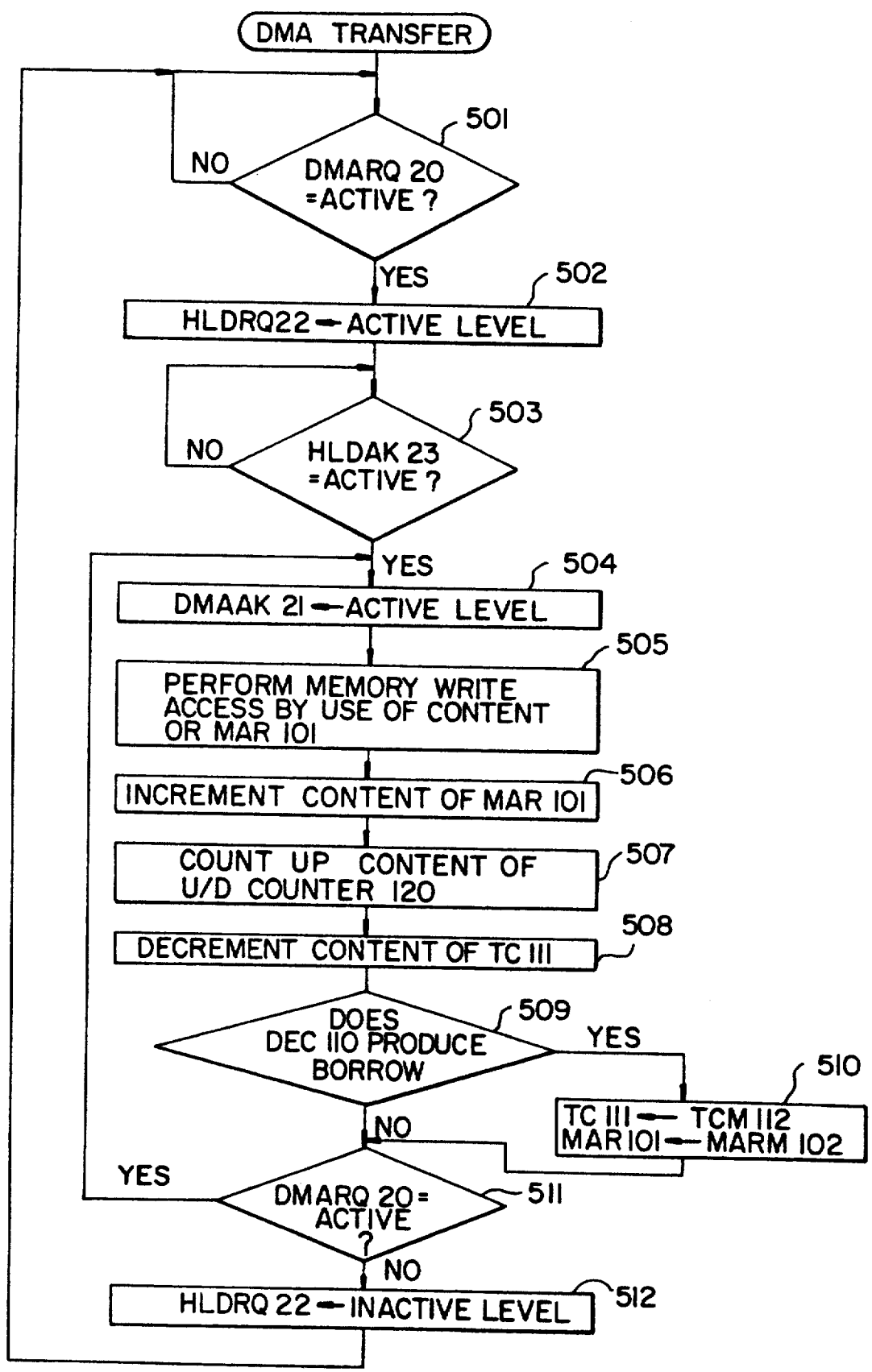
FIGS. 5A and 5B are flow charts representative of operations of the DMAC shown in FIG. 2.

On the other hand, when the peripheral unit 12 receives the data of a predetermined bit length from the external device, it generates a DMA request signal (DMARQ) 20 to DMAC 10. In response thereto, DMAC 10 operates in accordance with, a flow chart shown in FIG. 5A. Specifically, when DMAC 10 receives DMARQ 20 from the peripheral unit 12 (501), the control unit 150 changes HLDRQ 22 to the active level to acquire the bus control right from CPU 11 (502).

When HLDRQ 22 is changed to the active level, CPU 11 suspends the execution of the program and then brings the terminals coupled to the bus 5 into a high impedance state with by holding the contents of the program counter, program status wore register and other registers as they are. CPU 11 further changes a hold acknowledge signal (HLDAK) 23 to the active level to inform DMAC 10 of the transfer of the bus control right.

When the DMA control unit 150 detects the active level of HLDAK 23 (503), it supplies the active level of a DMA acknowledge signal (DMAAK) 21 to the peripheral unit 12 (504). The unit 12 thereby outputs the received data onto the bus 5. Simultaneously, DMAC 10 initiates a data write bus cycle by use of the content of MAR 101 (505), so that the data from the unit 12 is written into the destination area 500 of the memory 2 via the bus 5.

Each time when one DMA data transfer is performed, the content of MAR 101 is read out to INC/DEC 100 via a signal bus 35 and then incremented by one, the incremented content being then written back into MAR 101 (506). The content of the U/D counter 120 is also counted up by one (507) in response to an UP signal 38 (507). Further, the content of TC 111 is supplied via a signal bus 31 to DEC 110 and then decremented by one, the decremented content being then returned to TC 111 (508) via a signal bus 30. At this time, if a borrow signal 33 is generated by DEC 110, i.e. if the DMA data transfer is performed repeatedly by the times set into TC 111 (509), the contents of MARM 102 and TCM 112 are loaded to MAR 101 and TC 111, respectively. Accordingly, when DMARQ 20 is thereafter generated, the data transfer starts again from the leading address of the destination area 500 of the memory 2. The area 500 is thus used as a buffer area of a ring configuration, as shown in FIG. 3B.

Subsequently, DMAC 10 judges whether or not DMARQ 20 is active (511). When DMARQ 20 is not active, DMAC 10 changes HLDRQ 22 to the inactive level to inform CPU 11 of the renunciation of the bus control right (512). The operation is then returned to step 501. The current DMA data transfer is thus completed. On the other hand, in case of DMARQ 20 being active, the operation is shifted to step 504 to repeat the DMA data transfer.

When CPU 11 gets again the bus control right, it resumes the suspended program because all the internal registers such as the program counter and working registers have been holding values at the time when the program executed was suspended.

Figure 4B:
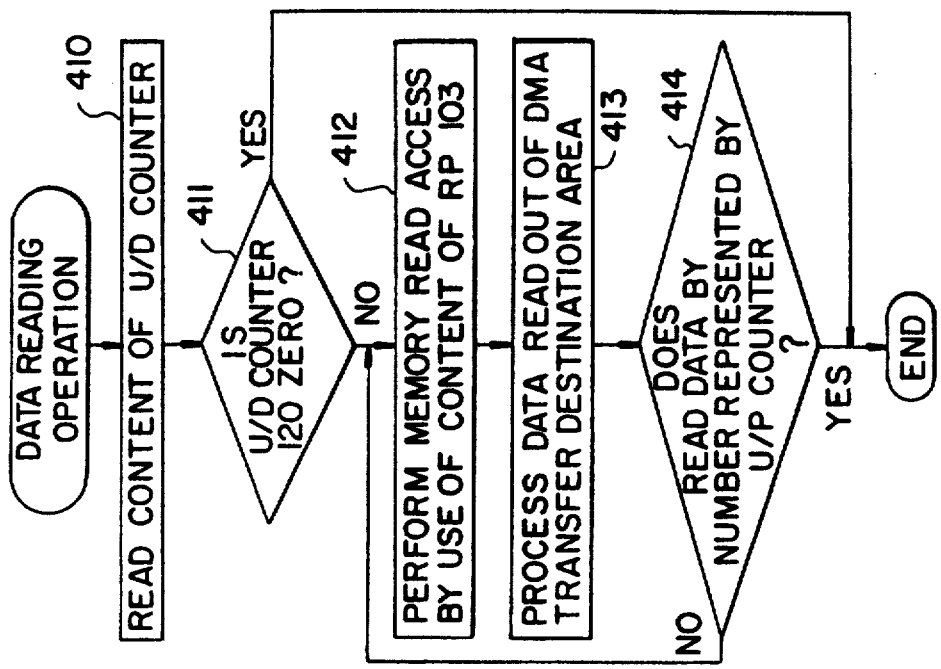
FIGS. 4A and 4B are flow charts representative of operations of CPU shown in FIG. 1.
Figure 4A:
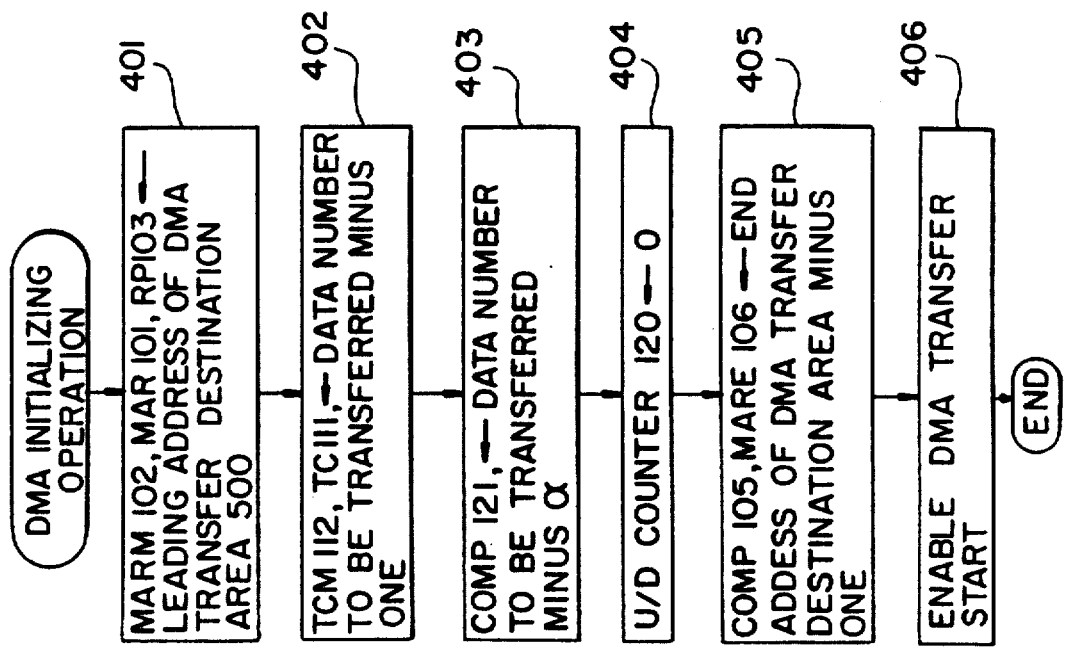

Unless DMAC 10 performs the DMA data transfer, CPU 11 can access the transfer destination area 500 of the memory 2 to read out the data therefrom in accordance with a flow chart shown in FIG. 4B. Specifically, CPU 11 first reads out the content of the U/D counter 120 (410) and detects the number represented by the content (411). The content of the U/D counter 120 represents the number of data which has been already transferred to the memory 2. The zero number means that no data transfer has been performed, so that the CPU 11 shifts to other program operation. On the other hand, the case of the content cf the counter 120 being not zero indicates that the DMA transfer has been performed at least one time. Therefore, CPU 11 reads out the content of RP 103 to obtain a first address of memory locations storing the data which are not yet processed by CPU 11. If the reading operation of the content of RP 103 is performed for the first time after the initial data setting operation for the DMAC 10, the content of RP 103 indicates the leading address of the transfer designation area 500. By an indirect addressing using the content of RP 103, CPU 11 can obtain the DMA-transferred data from the memory 2 (412). A predetermined processing operation is then performed on the read out data and supplied to the display control unit 3 (413).

Figure 5B:
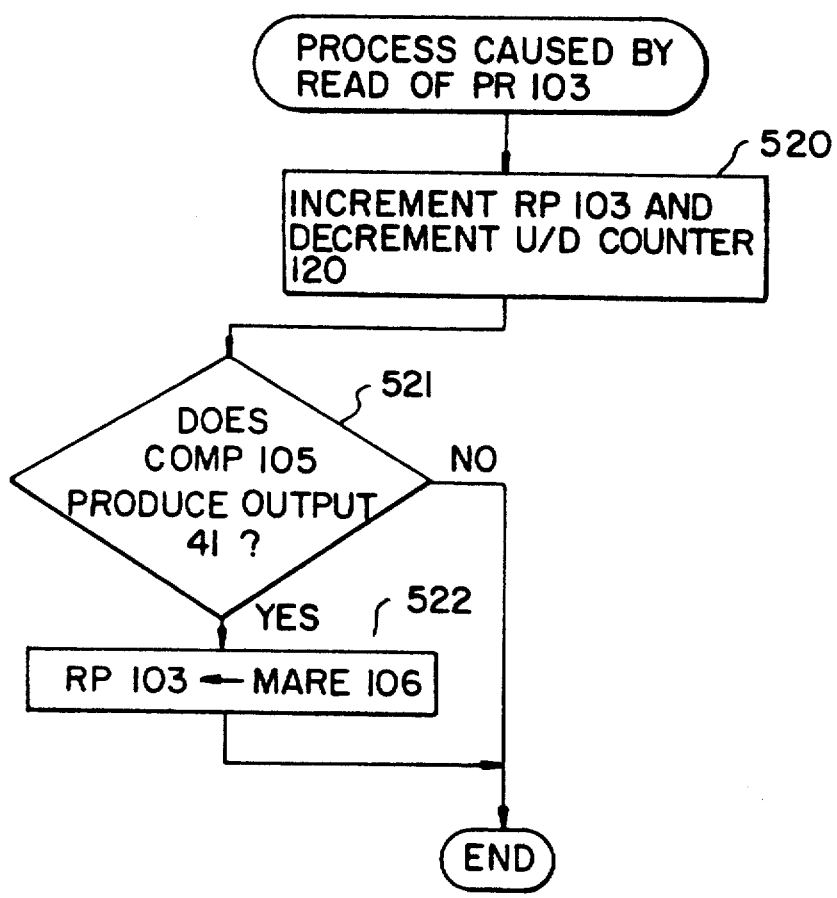

On the other hand, in DMAC 10, the operation shown in FIG. 5B is performed each time when the content of RP 103 is read out. Specifically, the control unit 150 supplies the content of RP 103 onto a data bus 36 and commands INC/DEC 100 to increment it, the incremented content being then returned to RP 103 via a data bus 37 (520). INC/DEC 100 further generates a down (D) signal 39. The counter 120 thereby counts down the content thereof by one. The content of RP 103 is monitored by COMP 105 through a bus 40. When the content of RP 103 reaches the end address of the area 500 minus 1, COMP 105 produces the signal 41, so that the content of MARE 106 is loaded to RP 103. Thus, the U/D counter 120 counts down the content thereof each tine CPU 11 reads out the content of RP 103, and counts up each time the DMA transfer is performed. Thus, the content of the counter 120 represents the number of data which are not yet read out by CPU 11, and the content of RP 103 represents the address of the memory location storing the data to be next read out by the CPU 11.

Turning back to FIG. 4B, CPU 11 repeats the data read operation by the number represented by the counter 120 (414).

The content of the U/D counter 120 is monitored by COMP 121 of DMAC 10. COMP 121 stored the data number of the area 500 minus $\alpha$ in the initial data setting operation, as described hereinbefore. When the content of the counter 120 reaches the data stared in COMP 121, therefore, COMP 121 produce the signal 25 which causes the control unit 150 to generate a DMA interrupt request signal (DMAINT) 24. The generation of DMAINT 24 means that the transfer destination area 500 is filled with the DMA-transferred data which are not yet processed by CPU 11. If the DMAREQ 20 is further produced in such a condition, the area 500 is subjected to be over-written. In order to avoid this problem, CPU 11 executes an interrupt program routine in response to DMAINT 24 to perform a successive data read operation. It is preferable that the data number minus a few bytes is set into COMP 121 since a time delay occurs in the interrupt request reception of CPU 11.

As described above, only by initializing DMAC 10 once, the DMA data transfer is performed repeatedly from the peripheral unit 12 to the same transfer destination area 500 of the memory 2. Moreover, since RP 103 and the U/D counter 120 are provided, the transfer destination area 500 operates as a buffer having a ring configuration, as shown in FIG. 3B.

Figure 6:
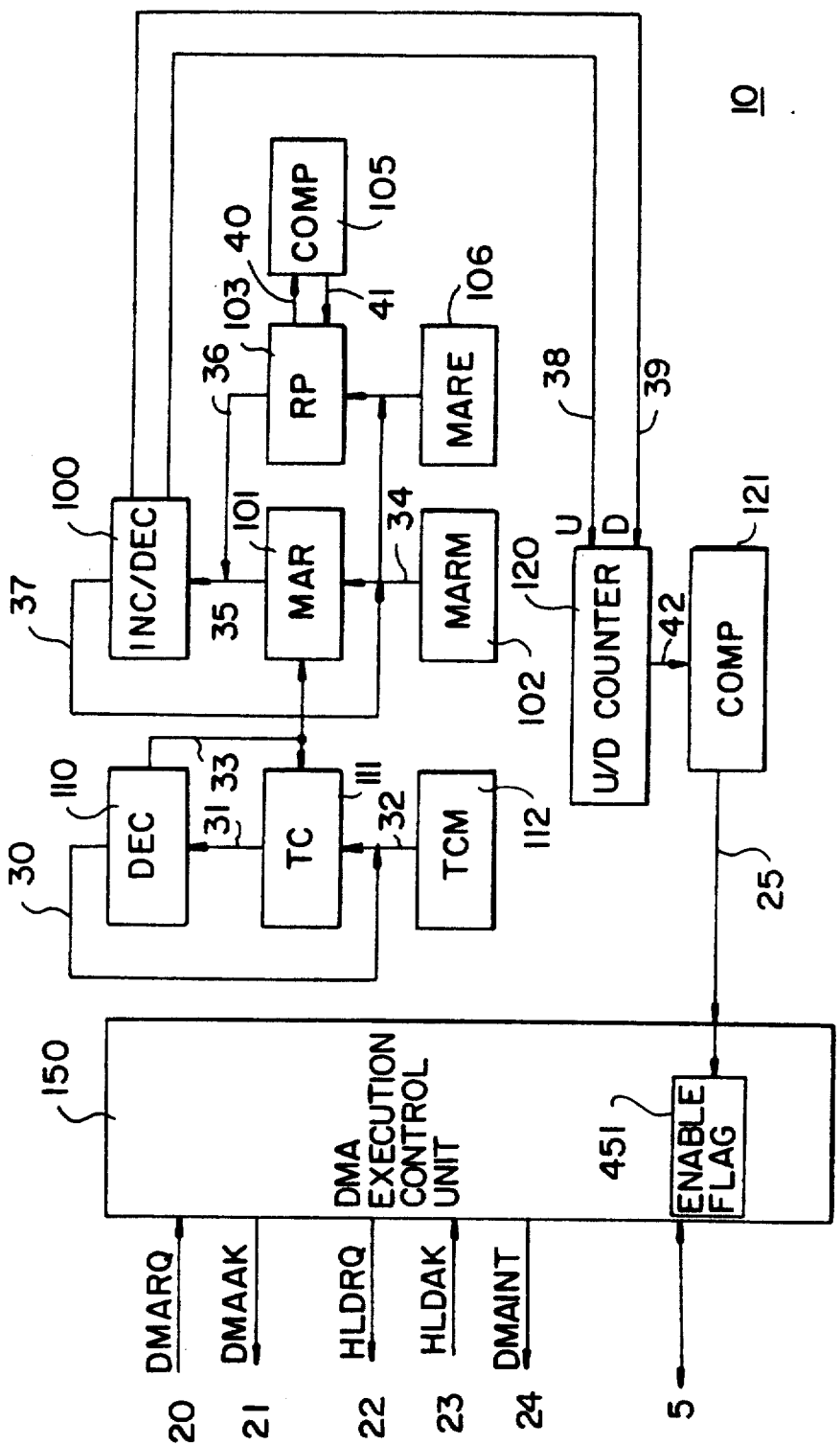
FIG. 6 is a block diagram representative of the DMAC according to a second embodiment of the present invention.

Referring to FIG. 6, there is shown another embodiment of the present invention, in which the same constituents as those shown in FIG. 2 are denoted by the same reference numerals to omit further description thereof. In this embodiment, the DMA control unit 150 includes a transfer-enable flag 451 which is brought into a reset state by the signal 25 from COMP 121. The flag 451 is set in the initial data setting operation by CPU 11 to enable the DMA transfer. When COMP 121 produces the signal 25 to indicate that the transfer destination area 500 is filled with the transferred data, the flag 451 is changed to the reset state, so that the DMA transfer is inhibited. Accordingly, the area 500 will not be over-written even when the CPU 11 does not initiate the successive data read operation immediately. The flag 451 is set again in the interrupt processing routine of CPU 11 for the successive data read operation.

In the above embodiments, If the DMA data transfer starts from the end address of the area 500, the contents of MAR 101 and RP 103 are decremented by INC/-DEC 100.

While the above description is made on the DMA transfer from the peripheral unit to the memory, the DMA transfer from the memory to the peripheral unit is also required and hence will be described below.

Figure 7:
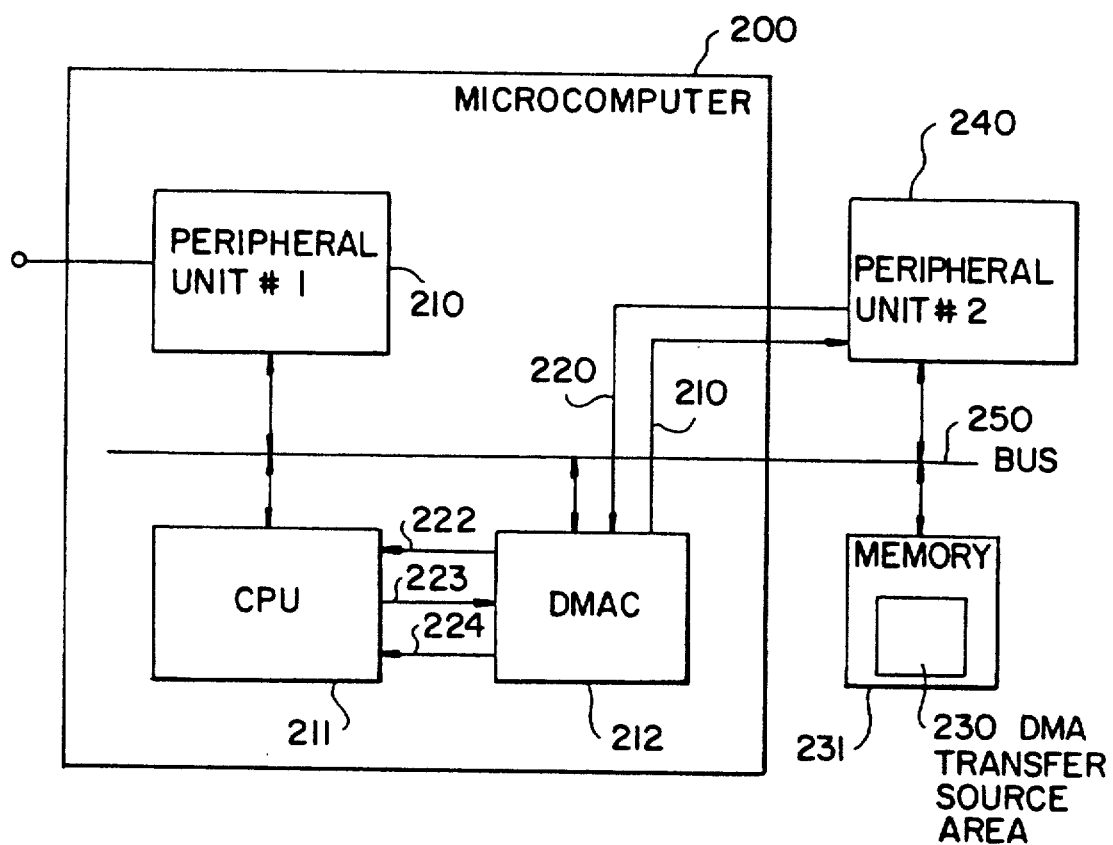
FIG. 7 is a block diagram representative of an information processing system employing the DMAC according to a third embodiment of the present invention.

FIG. 7 shows an information processing system employing a microcomputer 200 incorporating DMAC 212 according to a third embodiment of the present invention to perform DMA data transfer from a memory to a peripheral unit. The microcomputer 200 includes CPU 211, a peripheral circuit 210 (data transfer control unit, for example) and DMAC 212 for performing DMA data transfer from a memory 231 to another peripheral unit 240 which is a printer control unit in particular. The microcomputer performs a predetermined operation on data from the peripheral unit 210 and/or the memory 231 and then writes the processed data into a transfer source area 230 of the memory 231. The data stored in the source area 230 are in turn transferred to the peripheral unit 240 by DMA data transfer. The unit 240 includes a data read/write buffer and performs a printer control in response to the data transferred from the source area 230. The memory 231 includes a program memory area and a data memory area in addition to the transfer source area 230.

Figure 8:
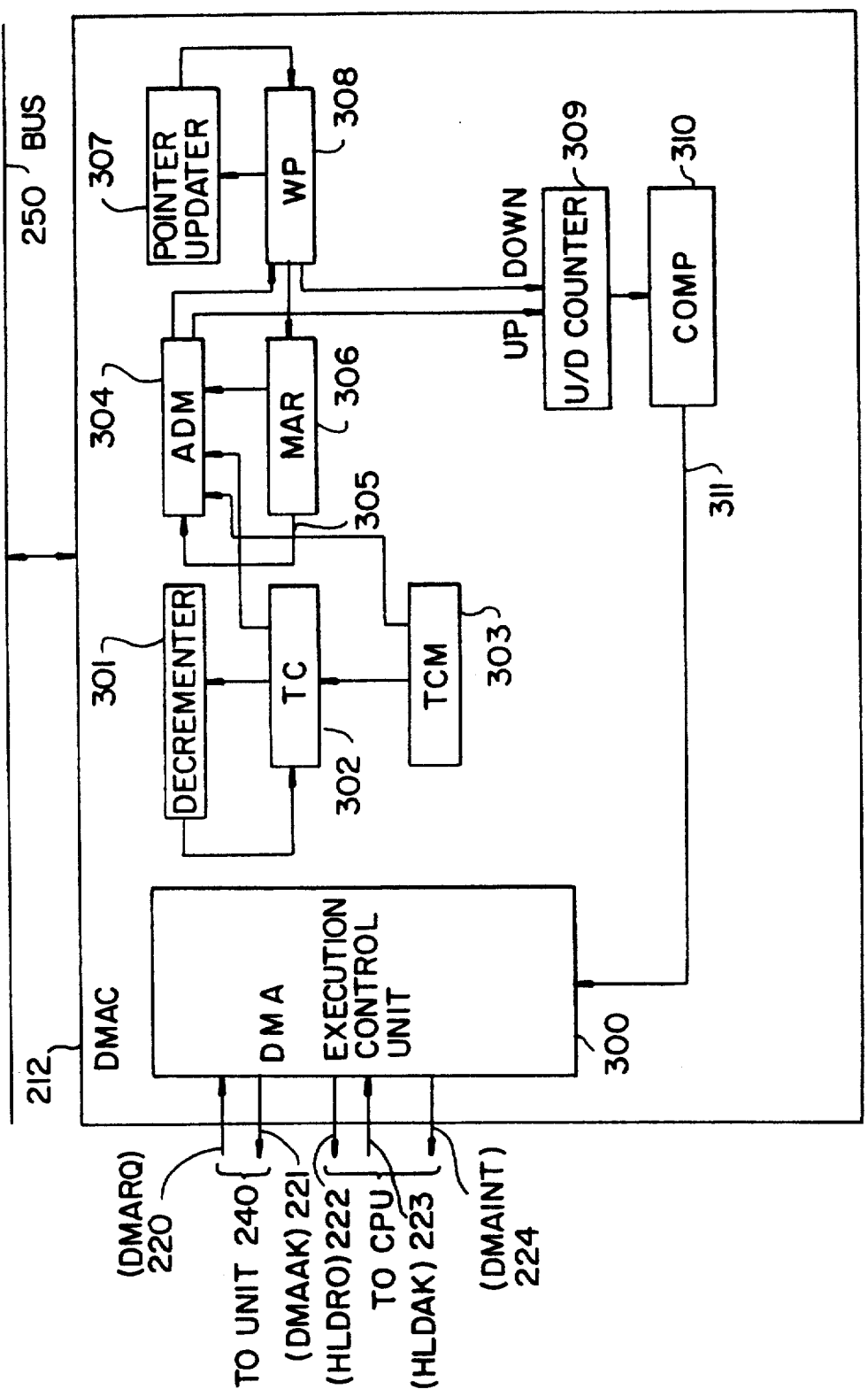
FIG. 8 is a block diagram representative of the DMAC shown in FIG. 7.

Referring to FIG. 8, DMAC 212 includes a memory address register (MAR) 306, a terminal counter modulo register (TCM) 303, a terminal counter (TC) 302, an address generator (ADM) 304, a write point (WP) 308, an up/down counter (U/D counter) 309, a compare register (COMP) 310, a pointer updater 307, and a decrementer 301. MAR 306 stores the end address of the transfer source area 230 plus one, and TCM 303 stores a data number of area 230, i.e., the number of DMA transfer times to be executed. TC 302 stores the number of times by which the DMA transfer has been actually executed. ADM 304 performs the subtraction of TC 302 from MAR 306 or of TCM 303 from MAR 306 to generate a DMA access address. WP 308 stores a memory address into which CPU 211 is the write next data to be transferred. The U/D counter 309 counts up the contents thereof each time one DMA transfer is executed and counts down it each time CPU 211 uses the content of WP 308, so that the content of the counter 309 indicates the vacant data number of the source area 320. The COMP 310 compares the data stored therein with the value of the counter 309 to produce a signal 311 indicating that both of them are equal to each other. The content of WP 308 is updated by the pointer updater 301 each time it is used by CPU 211, and the content of TC 302 is decremented by the decrementer 301 each time one DMA transfer is performed. DAMC 212 further includes a control unit 300 for controlling a whole operation such as a transfer/receiving operation of a bus control right, a DMA transfer timing control operation and so forth.

In operation, DMAC 212 requires initial data for performing DMA transfer. The initial data setting operation is performed by CPU 211 in accordance with a flow chart shown in FIG. 10A. Specifically, WP 308 is set with the leading address of the transfer source area 230 (1001), and MAR 306 is set with the end address of the area 230 plus one (1002). Next, the data number of the source area 230 is written into TC 302, TCM 303 and the U/D counter 309, respectively (1003). The data number represents the number of bytes of the source area 230 from the leading address to the end address in the case of DMA transfer of byte data, for example. COMP 310 is set with the above data number minus α ((1004). α is zero to a few bytes. Thereafter, the data write operation using the contents of WP 307 for writing data to be DMA transferred into the source area 230 is performed repeatedly until the count value of the U/D counter 309 becomes smaller than the storing value of COMP 310 (1006, 1007). The transfer-enable flag in the control unit 300 is then set to enable the start of DMA operation (1008). As mentioned above, the content of WP is updated and the content of the counter 309 is counted down each time the data write operation using WP 307 is performed.

Figure 10B:
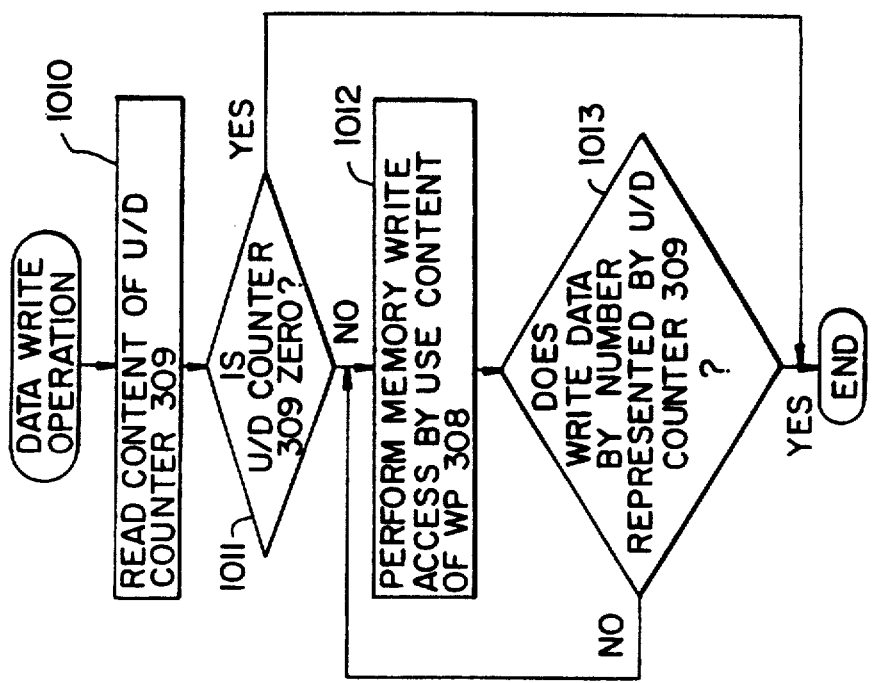
FIGS. 10A and 10B are flow charts representative of operations of the CPU shown in FIG. 7.

CPU 211 continues the execute a program to perform subsequent operations. Through those operations, when CPU 211 prepares new data to be DMA-transferred, it can write them into the source area 230 at that timing. Specifically, as the data write operation is shown in FIG. 10B, CPU 211 first reads out the contents of the U/D counter 309 (1010). If the content of counter 309 is zero to indicate that the transfer source area 230 has no vacant location, the data write operation is not performed (1011). on the other hand, when the counter 309 indicates a certain value not zero, the new data is written into the memory location pointed to by WP 307 (1012), and this operation is repeated by the number of times indicated by the contents of the counter 309 (1013). It is noted that when the number of the newly prepared data is smaller than the data number indicated by the counter 309, only the prepared data are written into the source area 230. Thus, so long as the source area 230 has vacant locations, CPU 11 can write data to be transferred into the vacant locations of the area 230 at arbitrary timings.

Figure 10A:
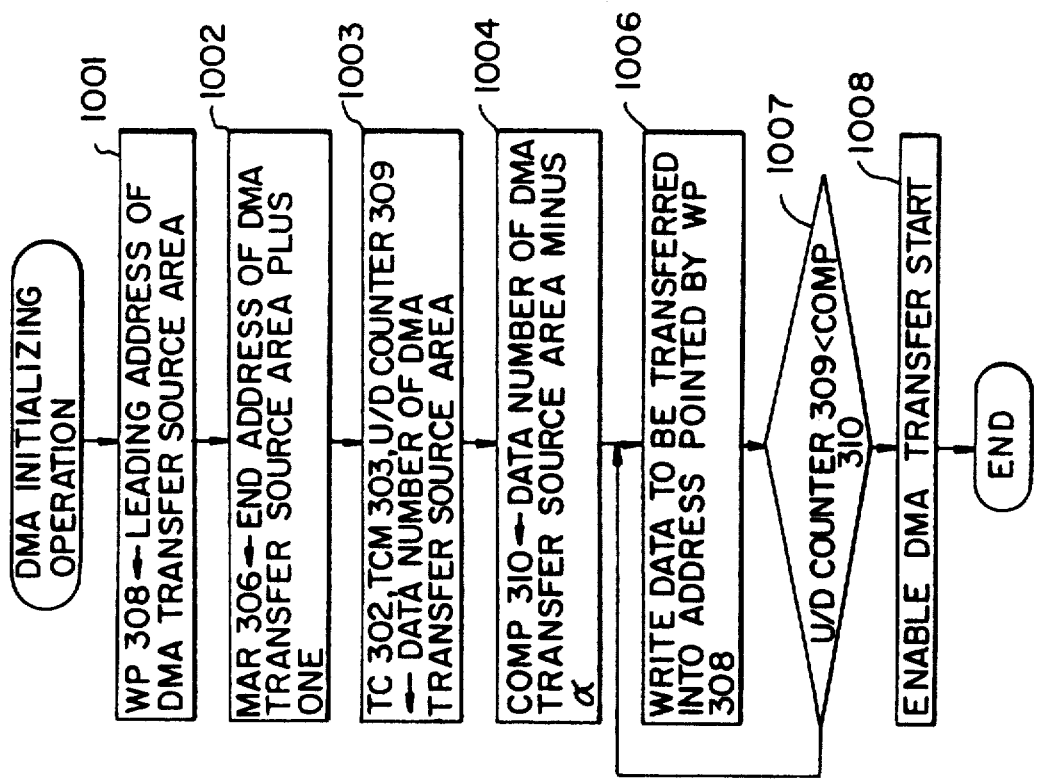
Figure 11:
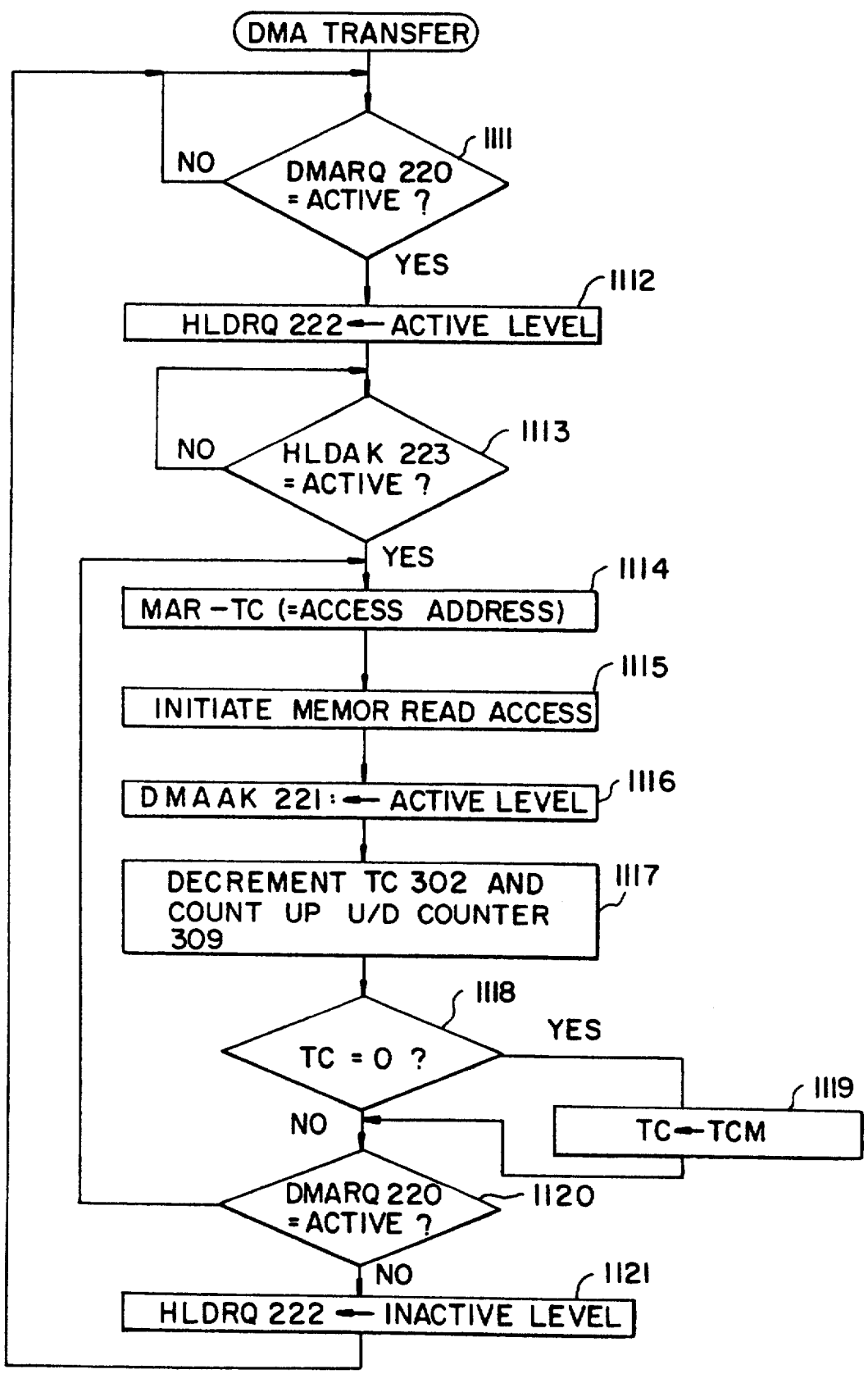
FIG. 11 is a flow chart representative of an operation of the DMAC shown in FIG. 8.

On the other hand, DMAC 212 is allowed to start to DMA transfer by the step 1008 of CPU 211 shown in FIG. 10A and thus operates in accordance with a flow chart shown in FIG. 11.

More specifically, when DMARQ 220 is activated by the peripheral unit 240 (1111), the control unit 300 changes HLDRQ 222 to the active level to require the bus control right from CPU 211 (1112).

CPU 211 executes a program with monitoring the level of HLDRQ 222. By the active level of HLDRQ 222, therefore, CPU 211 suspends the execution of a program with holding the contests of internal registers such as a program counter, a program status word register, working registers and so forth, brings the bus output terminals into a high impedance state and then changes HLDAK 223 to the active level to transfer the bus control right to DMAC 212.

When DMAC 212 detects the active level of HLDAK 223 (1113), it commands ADM 304 to perform the operation of subtracting the contents of TC 302 from the contents of MAR 306 in order to obtain a DMA transfer address (1114). A memory read bus cycle using this DMA transfer address is then initiated (1115). As a result, the data is read out from the transfer source area 230 designated by the DMA transfer address and then transferred onto the bus 5. The DMA control unit 300 further produces the active level of DMAAK 221 (1116), so that the peripheral unit 240 catches the data from the memory 231. Each time when one DMA transfer is performed, the content of TC 302 is decremented by one by the decrementer 301 and the decremented content is then written back to TC 302 (1117). Accordingly, the DMA transfer address, which is obtained by subtracting TC 302 from MAR 306, is updated or incremented one by one. The contents of the U/D counter 309 is also counted up by one each time one DMA transfer is performed (1117).

When the DMARQ 220 is produced successively from the peripheral unit 240 (1120), the above-mentioned DMA transfer is repeated. When DMARQ 220 is changed to the inactive level, on the other hand, DMAC 212 inverts HLDRQ 222 to the inactive level to return the bus control right to CPU 211 (1121). The DMA cycle is thus completed.

When the DMA transfer is repeated by the times designated by TC 302, i.e., when TC 302 becomes zero, the control unit 300 loads the contents of TCM 303 to TC 302 (1119). When a subsequent DMARQ 220 is produced, therefore, the DMA transfer is performed from the leading address of the transfer source area 230 of the memory 231. The source area 230 is thereby used repeatedly.

Figure 9:
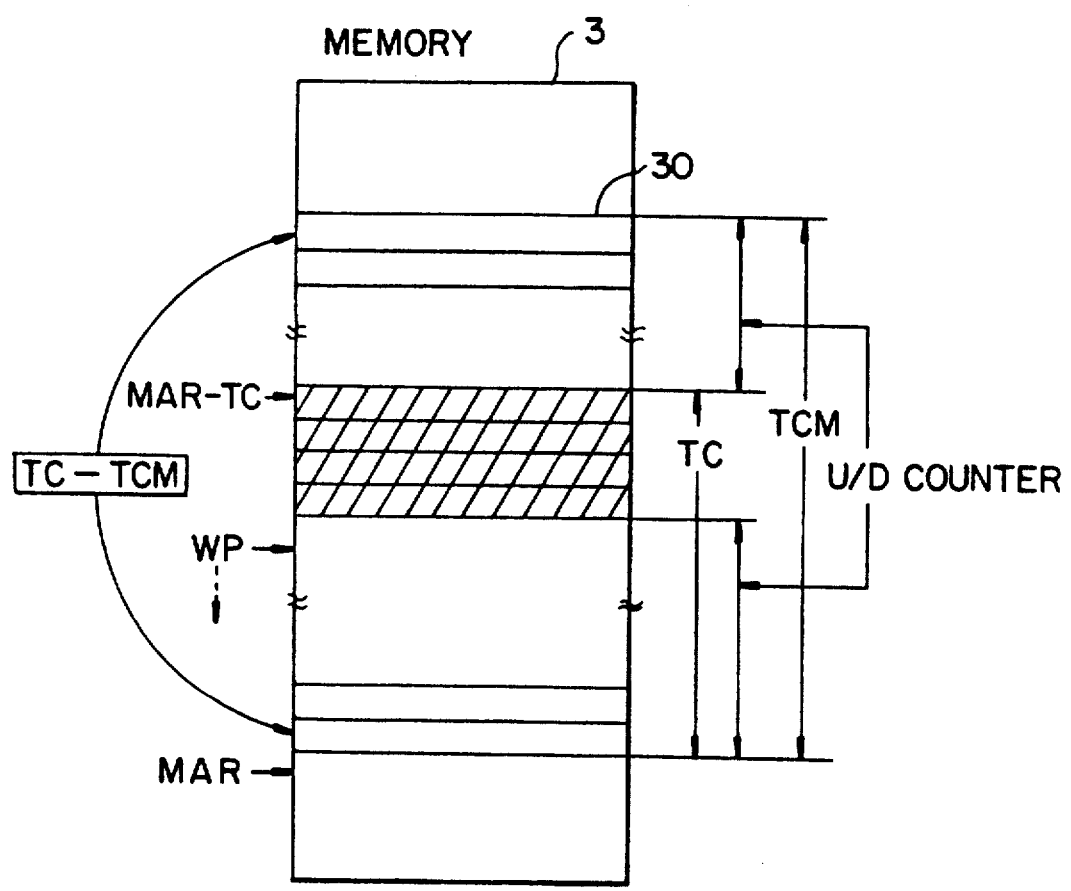
FIG. 9 is a memory map of a memory shown in FIG. 7.

On the other hand, when CPU 211 again gets the bus control right, it resumes executing the suspended program. In the execution of a program, CPU 211 writes data to be newly transferred into the transfer source area 230 in accordance with the operation shown in FIG. 10B, if required. The contents of the U/D counter 309 is counted down by one and the content of WP 308 is incremented by one each time the data write operation is executed to the transfer source area 230. MAR 306 has a function of comparing the content thereof with the contents of WP 308. When both of them become equal to each other, i.e. when the content of WP 308 exceeds the end address of the transfer source area 230, MAR 306 supplies the coincident signal 305 to ADM 304. In response thereto, ADM 304 subtracts the contents of TCM 303 from MAR 306 and then writes the subtracted resultant into WP 308. As a result, WP 308 is updated to the leading address of the transfer source area 230. Thus, the respective registers of DMAC 212 and the transfer source area 230 have a relationship shown in FIG. 9.

The contents of the U/D counter 309 is monitored by COMP 310 which stores the initial data of the data number of the transfer source area 230 minus α. If the contents of the counter 309 reaches the stored data of COMP 310, COMP 310 produces and supplies the coincident signal 311 to the execution control unit 300. This signal 311 represents that no data to be transferred remains in the transfer source area 230. Therefore, the control unit 300 generates DMA interrupt request (DMAINT) 224 to CPU 211 in response to the signal 311.

CPU 211 accepts DMAINT 224 and immediately writes data to be newly transferred into the source area 230 in an interrupt program routine until the content of the U/D counter 309 becomes smaller than the value of COMP 310. It is preferable to design the value of α to be a few bytes, because a time delay occurs fill CPU 211 shifts the interrupt program routine.

Also in this embodiment, the same effects as those of the first embodiment are provided.

Figure 12:
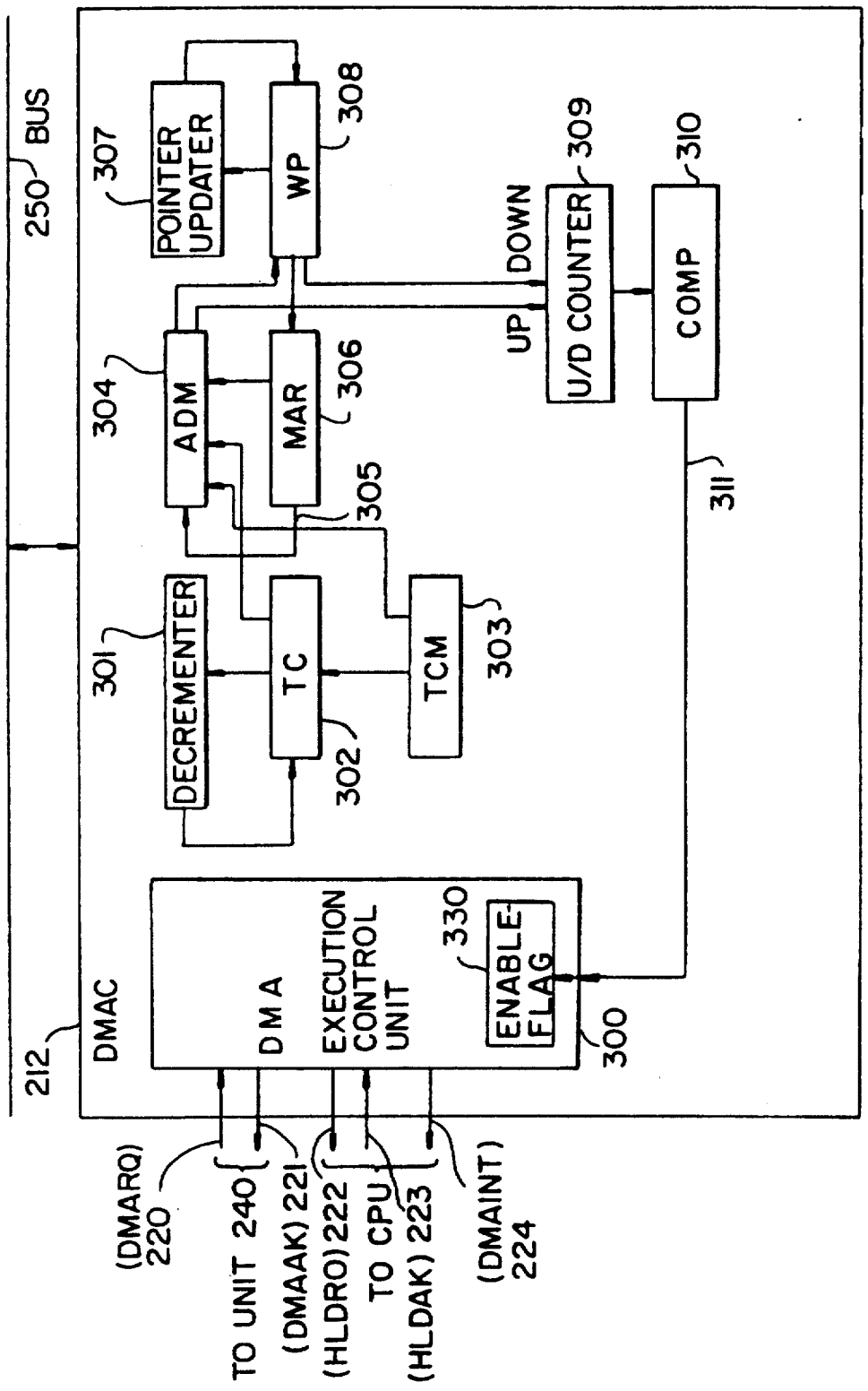
FIG. 12 is a block diagram representative of a fourth embodiment of the present invention.

Referring to FIG. 12, DMAC 212 according to the fourth embodiment induces an execution control unit 300 having a transfer-enable flag 330 which is set by the initial data setting operation and the above interrupt program operation by CPU 211 and reset by the signal 311 from COMP 310. The other constituents are the same as those of the third embodiment, and thus the further description thereof will be omitted. When the signal 311 is generated, the flag 330 is changed to the reset state to inhibit the DMA transfer operation of DMAC 211. Accordingly, no incorrect data is thereafter transferred to the peripheral unit 240. The flag 330 is set by CPU 211 after data to be next transferred are written into the source area 230.

Figure 13:
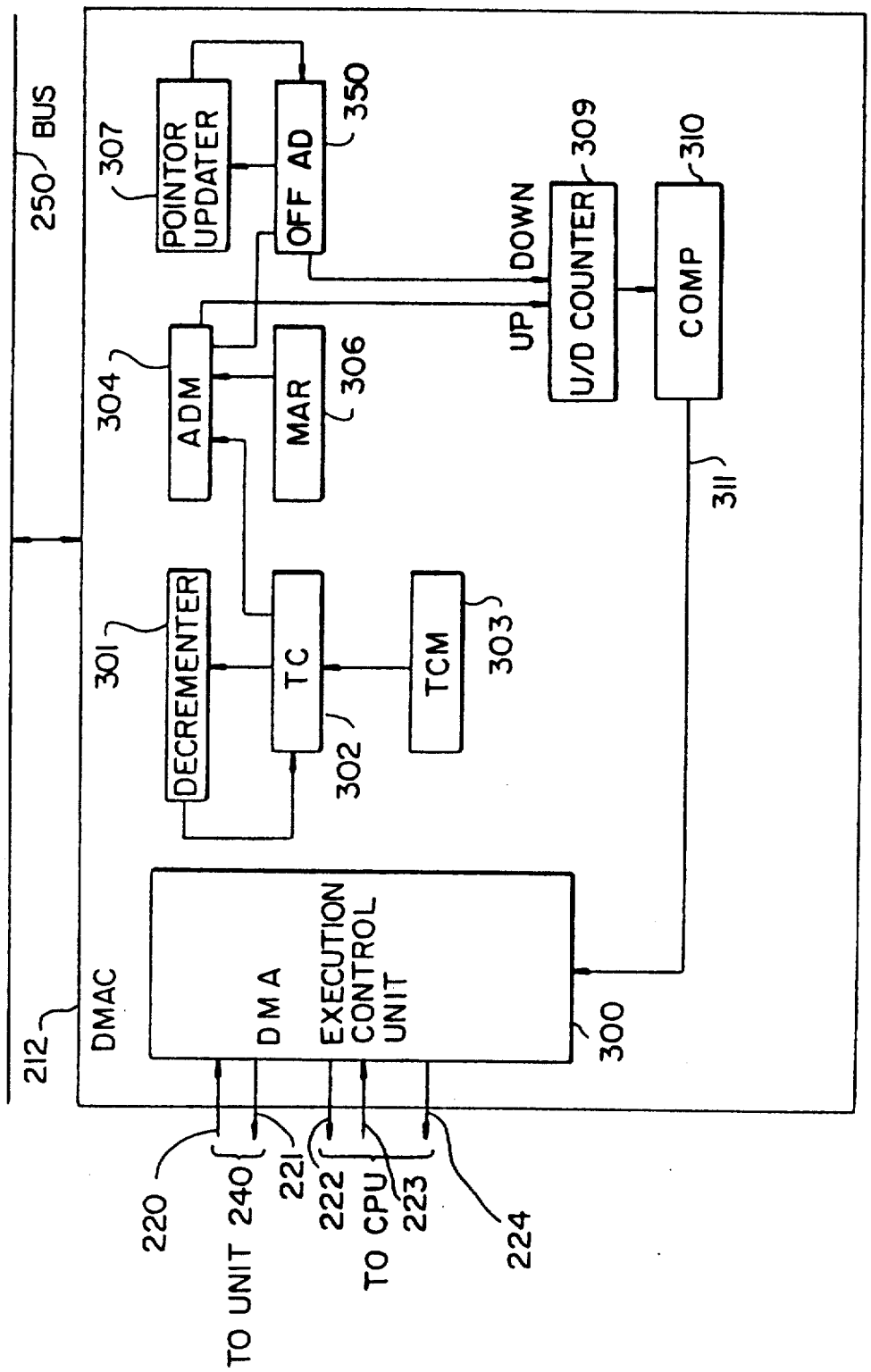
FIG. 13 is a block diagram representative of a fifth embodiment of the present invention.

Referring to FIG. 13, there is shown DMAC according to the fifth embodiment of the present invention, wherein the same constituents as those shown in FIG. 8 are denoted by the same reference numerals to omit the further description thereof. In this embodiment, an offset address register (OFFAD) 350 is provided in place of WP 308. The address of the transfer source area 230, into which data to be DMA-transferred is to be written, is thus obtained by subtracting the content of OFFAD 350 from MAR 306 by use of AMD 304. OFFAD 350 is set, as initial data, with the data number of the transfer source area 230 in the initial data setting operation by CPU 211. MAR 306 is written with the end address of the source area 230 plus one, as mentioned above. Accordingly, in response to a request from CPU 211 of writting data to be DMA-transferred into the transfer source area 230, DMAC 212 produces the writing address obtained by subtracting the content of OFFAD 350 from MAR 306. The contents of OFFAD 350 are decremented by one by the pointer updater 307 each time the data write operation is performed by CPU 211. Therefore, the writing address is updated successively. When the content of OFFAD becomes zero, the control unit 300 loads the contents of TCM 303 to OFFAD 350.

It is apparent that the present invention is not limited to the above embodiments, but may be changed and modified without departing from the scope and spirit of the invention. For example, the DMACs shown in FIGS. 8, 12 and 13 can be used as the DMAC for performing DMA data transfer from a peripheral unit to a memory unit, Similarly, the DMACs shown in FIGS. 2 and 6 can be used as the DMAC for performing the data transfer from a memory to a peripheral unit.

What is claimed is:

1. A data transfer controller comprising:
   a first register for storing address information relative to a predetermined address of a memory area used for a DMA data transfer;
   a second register for storing a number of data to be transferred;
   means for performing said DMA data transfer between said memory area and a peripheral unit by use of at least said second register;
   a third register for storing data used for accessing said memory area;
   means for updating the data of said third register each time a memory access to said memory area is performed using said third register, said memory access being different and distinct from an access for said DMA data transfer;
   means including storage means for performing one of incrementing and decrementing operations on contents of said storage means each time said DMA data transfer is performed and for performing the other of said incrementing and decrementing operations on said contents of said storage means each time said memory access to said memory area is performed using said third register,
   said contents of said storage means representing, for DMA transfer into said memory area, the number of data transferred by said DMA data transfer means from said peripheral unit to said memory area but not read out from said memory area using said third register.

2. The data transfer controller as claimed in claim 1, wherein said means for performing a DMA data transfer comprises:

means for supplying contents of said third register onto a data bus; and means for commanding said means for changing to increment said contents of said third register.

3. The data transfer controller as claimed in claim 1, further comprising monitoring means for monitoring said contents of said third register.

4. The data transfer controller as claimed in claim 1 further comprising a fourth register for storing address data to be set into said third register.

5. The data transfer controller as claimed in claim 1, wherein said means for performing said DMA data transfer comprises means for updating operation on said first, second and third registers.

6. The data transfer controller as claimed in claim 1, wherein said means for performing said DMA data transfer comprises:

means for requesting operation of bus control right; and means for releasing operation of said bus control right.

7. The data transfer controller as claimed in claim 1, further comprising:

a compare register;

means for comparing contents of said storage means with contents of said compare register.

8. A method for controlling data transfer comprising the steps of:

storing in a first register, address information relative to a predetermined address of a memory area used for a DMA data transfer;

storing in a second register, a number of data to be transferred;

performing said DMA data transfer between said memory area and a peripheral unit by use of at least said second register;

storing in a third register, data used for accessing said memory area;

updating the data in said third register each time a memory access to said memory area is performed using said third register, said memory access being different and distinct from an access for said DMA data transfer;

storing in a storage unit, predetermined initial data;

performing one of incrementing and decrementing operations on the data in said storage unit each time said DMA data transfer is performed; and performing the other of said incrementing and decrementing operations on the data in said storage unit each time said memory access to said memory area is performed using said third register, said data in said storage unit representing, for DMA transfer into said memory area, the number of data transferred during DMA transfer from said peripheral unit to said memory area but not read out from said memory area using said third register.

9. The method of controlling data transfer as claimed in claim 8, further comprising the steps of:

supplying a content of said third register onto a data bus;

incrementing said content supplied on said data bus resulting in an incremented content; and storing said incremented content in said third register.

10. The method of controlling data transfer as claimed in claim 8 further comprising the step of:

producing a signal when said data stored in said third register reaches an end address of said memory area.

11. The method for controlling data transfer as claimed in claim 8, further comprising the step of:

storing an address data, said address data to be set into said third register.

12. The method for controlling data transfer as claimed in claim 8, further comprising the step of:

requesting and releasing operation of the bus control right in accordance with said DMA data transfer.

13. The data transfer controller as claimed in claim 1 wherein said memory area comprises a buffer area with a ring construction.

14. The method for controlling data transfer as claimed in claim 8, wherein said step of performing said DMA data transfer comprises performing a DMA data transfer between a buffer area with a ring construction and said peripheral unit.

* * * * *